(12) United States Patent
  Koss

(10) Patent No.: US 9,469,946 B2
(45) Date of Patent: Oct. 18, 2016

(54) METHOD FOR SUPPORTING COOLING PIPES AND REINFORCING BARS IN AN ICE RINK BY PROVIDING RINK CHAIR SUPPORT SECTIONS HAVING COUPLING MEANS

(71) Applicant: Hunter Wire Products Ltd., Winnipeg (CA)

(72) Inventor: Rick Koss, Winnipeg (CA)

(73) Assignee: 7232552 Manitoba LTD., Winnipeg, Manitoba (CA)

( * ) Notice: Subject to any disclaimer, the term of this patent is extended or adjusted under 35 U.S.C. 154(b) by 9 days.

(21) Appl. No.: 14/599,117

(22) Filed: Jan. 16, 2015

(65) Prior Publication Data

US 2016/0208445 A1    Jul. 21, 2016

(51) Int. Cl.
  *F16M 13/00*   (2006.01)
  *E01C 13/00*   (2006.01)
  *F16L 3/22*    (2006.01)
  *E01C 13/10*   (2006.01)

(52) U.S. Cl.
  CPC .......... *E01C 13/003* (2013.01); *E01C 13/105* (2013.01); *F16L 3/221* (2013.01)

(58) Field of Classification Search
  CPC ...... E01C 13/003; E01C 13/105; F16L 3/221
  See application file for complete search history.

(56) References Cited

U.S. PATENT DOCUMENTS

| 2,517,411 | A | 8/1950 | Patterson |
| 5,467,948 | A | 11/1995 | Gillespie |
| 5,876,001 | A | 3/1999 | Wiebe |
| 6,021,646 | A | 2/2000 | Burley |

*Primary Examiner* — Ryan J Walters
(74) *Attorney, Agent, or Firm* — Adrian D. Battison; Ryan W. Dupuis; Ade & Company Inc.

(57) ABSTRACT

A method for supporting cooling pipes and reinforcing bars in an ice rink is disclosed. The method provides rink chair support sections, each having a base structure with a first overlapping portion at one longitudinal end, a second overlapping portion at an opposite longitudinal end, and a middle portion intermediate the first and second overlapping portions. Each support section also has a support arrangement to support the pipes and bars, which is attached to the first overlapping and middle portions so as to stand upwardly therefrom. Further, the first overlapping portion has a hole that is arranged to receive a protruding element coupled to the second overlapping portion for longitudinally coupling support sections end-to-end. The method also involves arranging the support sections into a plurality of rows and coupling the support sections within each row so that each rink chair support of a support arrangement supports a different pipe.

20 Claims, 6 Drawing Sheets

METHOD FOR SUPPORTING COOLING PIPES AND REINFORCING BARS IN AN ICE RINK BY PROVIDING RINK CHAIR SUPPORT SECTIONS HAVING COUPLING MEANS

FIELD OF THE INVENTION

The present invention relates to a method for supporting cooling pipes and reinforcing bars prior to installation of a cast concrete layer thereupon in an ice rink of the type involving a rink chair support section that has coupling means for longitudinally coupling a plurality of support sections end-to-end, and more particularly the present invention relates to a method for supporting cooling pipes and reinforcing bars prior to installation of a cast concrete layer thereupon in an ice rink in which the coupling means includes a hole in a first overlapping portion and a protruding element coupled to a second overlapping portion, in which the hole is arranged for receiving the protruding element therein so as to longitudinally couple first and second ones of the support sections end-to-end.

BACKGROUND

The disclosed invention is a method for supporting cooling pipes and reinforcing bars prior to installation of a cast concrete layer thereupon in an ice rink involving rink chair support sections with coupling means, which affords longitudinal coupling of a plurality of support sections end-to-end.

During the installation process of the cooling pipes and reinforcing bars in an ice rink, prior to receiving the cast concrete layer thereon, rink chair support sections similar to the ones described by U.S. Pat. No. 5,467,948 (Gillespie) or U.S. Pat. No. 5,876,001 (Wiebe) are lined up in rows to span a full width of the ice rink on the horizontal ground surface thereof because a single rink chair support section is insufficiently long to span the full width of the ice rink. Each row of the support sections is formed by overlapping support sections laterally. This arrangement results in wasted material as each rink chair support section contributes one fewer individual rink chair to a longitudinal length of the row due to the need to align the support sections by overlapping each adjacent longitudinal end portion of adjacent support sections. Even after forming the rows, the support sections remain free to move relative to one another as the support sections are not coupled to each other. Only after the cooling pipes and reinforcing bars are placed upon the support sections is each support section restricted in longitudinal movement; however, the support sections still remain free to move transversely.

An example of a prior patent that describes floor elements that can be coupled so as to form an ice rink is U.S. Pat. No. 6,021,646 to Burley. The patent given to Burley shows ice rink floor elements which comprise fastening elements that afford coupling of adjacent floor elements by sliding lateral insertion of the male fastening element of a first floor element into the female fastening element of a second floor element. However, these floor elements comprise channels through which coolant may be pumped, and as such do not support cooling pipes as in traditional construction of ice rinks like the apparatuses of U.S. Pat. Nos. 5,467,948 and 5,876,001.

Another example of a prior patent is U.S. Pat. No. 2,517,411 to Patterson for a fastener for refrigerator evaporator. The patent to Patterson includes a stem and a clip with an opening having tangs for fastening the clip to the stem. The tangs of the clip function as the retaining mechanism to fasten the clip to the stem. While the fastener is simple, it has not been applied to the field of apparatuses for supporting cooling pipes in ice rinks.

SUMMARY OF THE INVENTION

According to one aspect of the invention there is provided a method for supporting cooling pipes and reinforcing bars prior to installation of a cast concrete layer thereupon in an ice rink, wherein the ice rink also comprises a horizontal ground surface, the method comprising the following steps given in no particular order:

providing a plurality of rink chair support sections, each one of the rink chair support sections having:
  a base structure for resting on the ground surface having:
    a first overlapping portion at one longitudinal end, the first overlapping portion having a first end edge of at a free longitudinal end thereof;
    a second overlapping portion at an opposite longitudinal end, the second overlapping portion having a second end edge at a free longitudinal end thereof;
    a middle portion intermediate between the first and second overlapping portions;
    opposing lateral edges joining the first and second end edges;
    a junction line which defines a junction between the second overlapping portion and the middle portion, the junction line spanning between the lateral edges;
  a support arrangement arranged to support the cooling pipes and reinforcing bars, the support arrangement being attached to the first overlapping portion and the middle portion so as to stand upwardly therefrom;
arranging the plurality of support sections in a plurality of rows;
setting the reinforcing bars upon the rink chair support sections so as to be received in the rink chair support sections by the support arrangements thereof;
setting the cooling pipes upon the rink chair support sections so as to be received in the rink chair support sections by the support arrangements thereof;
wherein the base structure of each one of the rink chair support sections further includes:
  a hole in the first overlapping portion;
  a protruding element coupled to the second overlapping portion, the protruding element having a first edge which meets a portion of the second overlapping portion;
  wherein the hole is arranged to receive the protruding element therein so that a first one of the support sections and a second one of the support sections can be longitudinally coupled end-to-end in a working position;
and coupling the plurality of support sections in each one of the rows.

The embodiment as described in more detail hereinafter overcomes the drawbacks of the prior art by providing a method in which each rink chair support of the support arrangement of each one of the support sections supports a different cooling pipe when the support sections are arranged and coupled in a row. Furthermore, the present invention also provides a method in which movement of a first one of the support sections relative to a second one of the support sections is reduced in the working position of the support sections.

Preferably, the first edge of the protruding element has a protruding element orientation relative to said junction line and the hole has a hole orientation relative to the first end edge, the hole orientation being arranged to match the protruding element orientation so as to align the first one of the support sections and the second one of the support sections in rectilinear alignment in the working position.

Preferably, the protruding element has first and second longitudinal surface portions facing in respective opposing longitudinal directions that are arranged to engage longitudinal edge portions of the hole at longitudinally opposing ends thereof so as to reduce movement between support sections in the longitudinal directions in the working position.

Preferably, the protruding element has first and second transverse surface portions facing in respective opposing transverse directions that are arranged to engage transverse edge portions of the hole at opposing transverse ends thereof so as to reduce movement between support sections in the transverse directions in the working position.

Preferably, each one of the support sections has a first free end at one longitudinal end of the support arrangement above the first overlapping portion, the first free end being spaced inward from the first end edge at a first distance, and a second free end at an opposing longitudinal end of the support arrangement above the middle portion and closer to the second overlapping portion than to the first overlapping portion, the second free end being spaced inward from the junction line at a second distance which is proximate the first distance so as to maintain proper spacing in the longitudinal direction between the cooling pipes and reinforcing bars supported by the support arrangements in the working position.

Preferably, the protruding element is arranged for insertion into the hole in the upward direction.

Preferably, each one of the rink chair support sections further includes a retaining mechanism that prevents the protruding element from being removed from the hole in the working position. Preferably, the retaining mechanism is a projecting element coupled to the protruding element so as to project away therefrom. Preferably, the projecting element has a free end which is arranged to engage the second overlapping portion when the protruding element is being removed from the hole in the working position. Preferably, the projecting element is a tab.

Preferably, the base structure is a horizontal base plate.

Preferably, the hole is a slot.

Preferably, the protruding element is a flange.

One embodiment of the invention will now be described in conjunction with the accompanying drawings in which:

BRIEF DESCRIPTION OF THE DRAWINGS

In the drawings like characters of reference indicate corresponding parts in the different figures.

DETAILED DESCRIPTION

Figure 1:
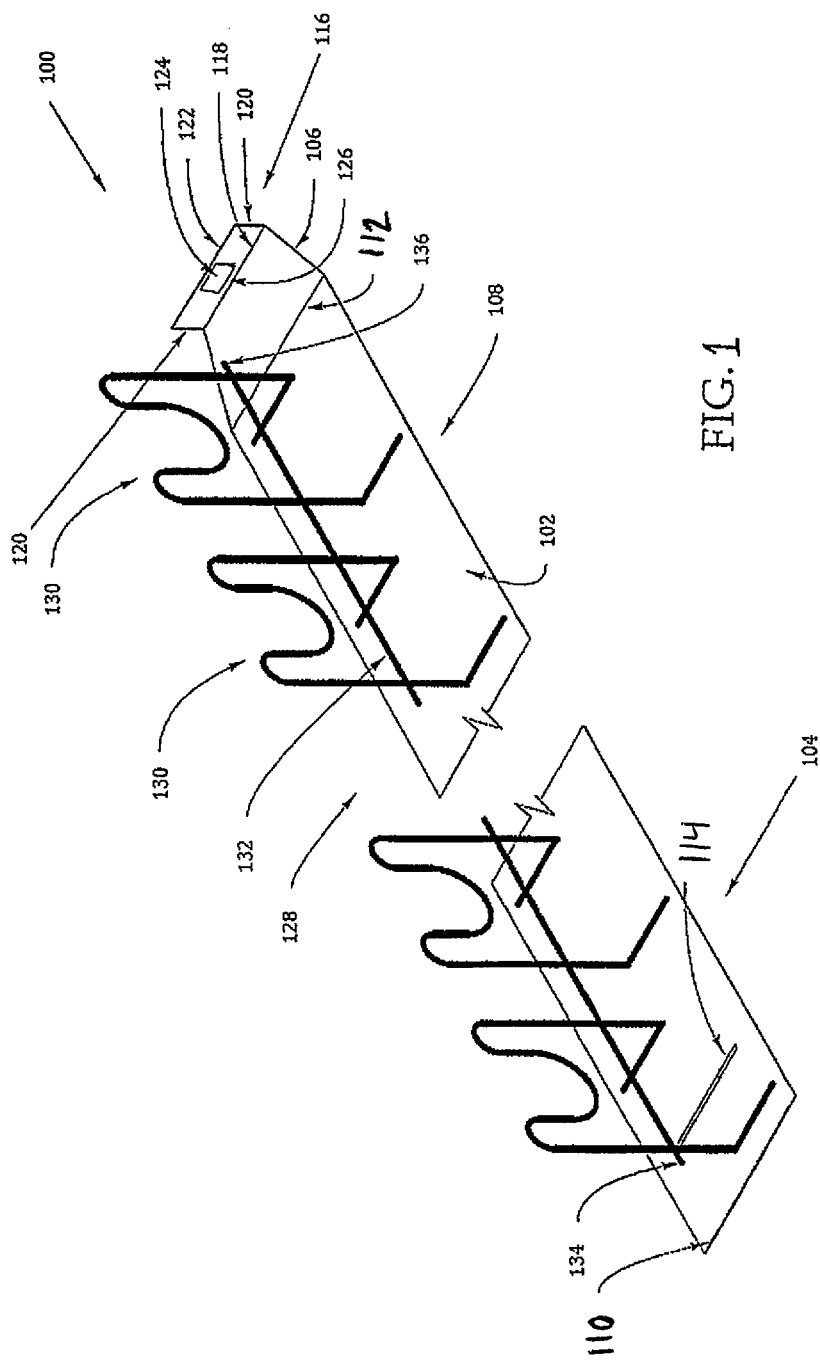
FIG. 1 is a right perspective view of a rink chair support section from its rear.

Referring to the accompanying figures there is illustrated a rink chair support section generally indicated by reference numeral 100 in FIG. 1. The rink chair support section is used to support cooling pipes 1 and reinforcing bars 2 of an ice rink upon a horizontal ground surface thereof prior to receiving a cast concrete layer thereon.

Figure 2:
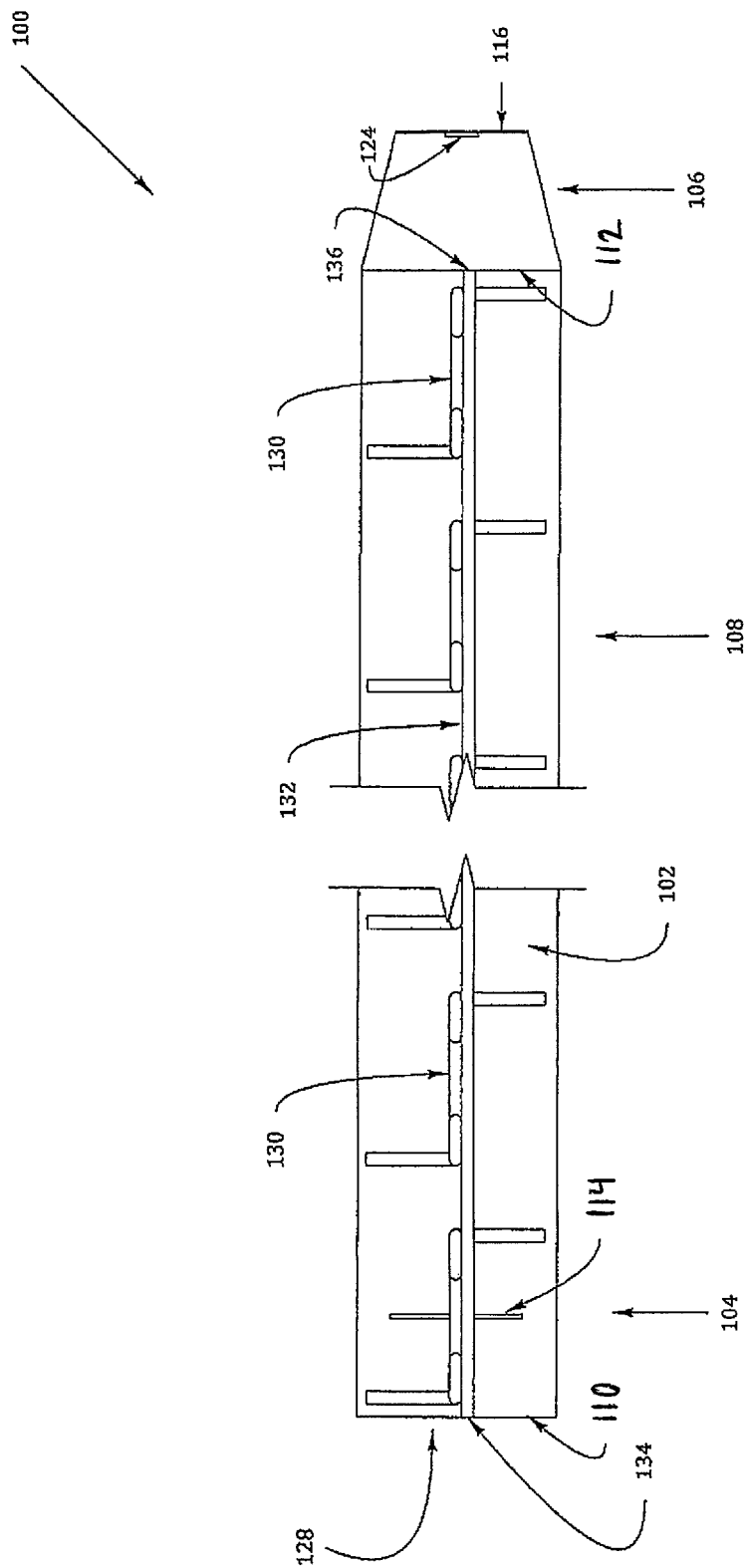
FIG. 2 is a top plan view of the rink chair support section in FIG. 1.
Figure 3:
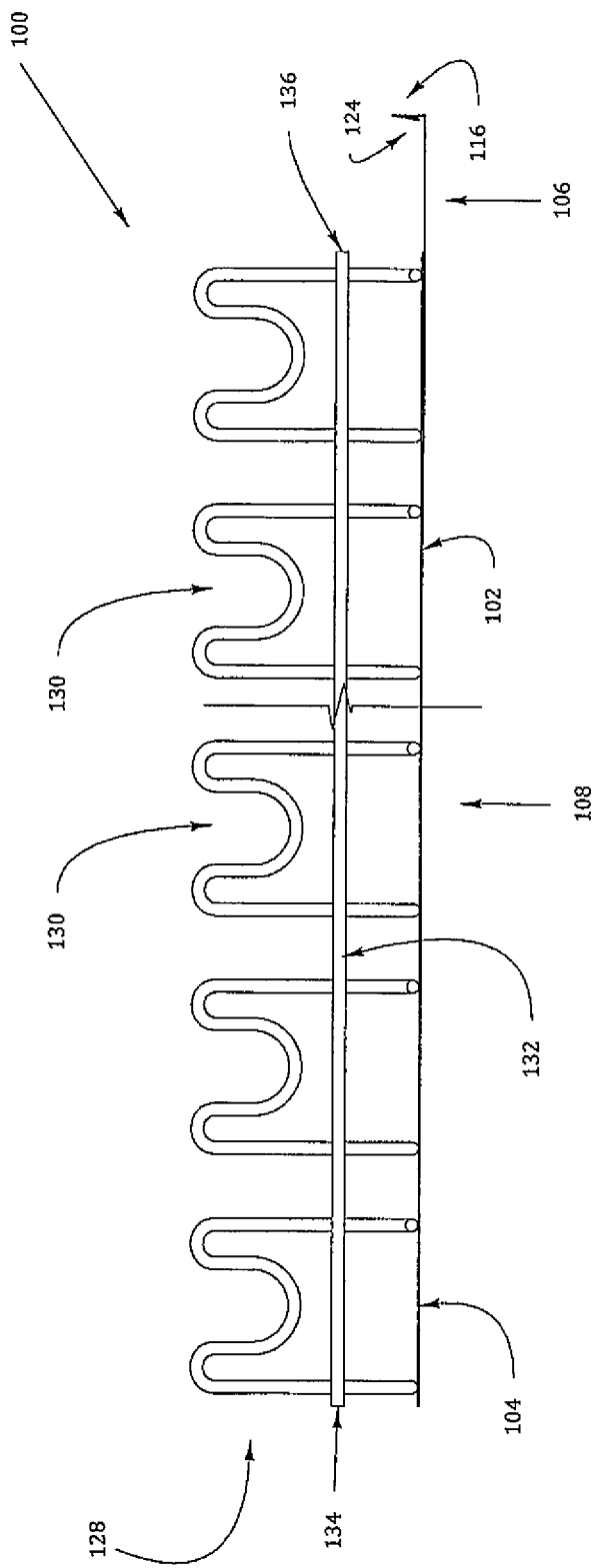
FIG. 3 is a left elevation view of the rink chair support section in FIG. 1.

The present embodiment of the rink chair support section 100 as shown in FIGS. 1-3 has a horizontal base plate 102 as a base structure for resting on the ground surface of the ice rink. The base plate is elongate and has a first overlapping portion 104 at one longitudinal end, a second overlapping portion 106 at an opposing longitudinal end, and a middle portion 108 intermediate between the overlapping portions. The first overlapping portion has a first end edge 110 of at a free longitudinal end thereof, and the second overlapping portion has a second end edge 111 thereof which is at a free longitudinal end of the second overlapping portion. Furthermore, the base plate has opposing lateral edges which span between the first and second end edges. The first overlapping portion and the middle portion considered together are rectangular in shape, and the second overlapping portion is trapezoidal in shape. The junction between the second overlapping portion and the middle portion is defined by a junction line 112 that spans between the opposing lateral edges of the base plate. The junction line meets each one of the lateral edges at a right angle at the middle portion, and the length of the junction line is a measure of a width of the horizontal base plate in a lateral direction. The lateral edges of the base plate at the second overlapping portion start at the junction line and taper inward towards an axis at a longitudinal center of the base plate. The lateral edges at the second overlapping portion terminate at the second end edge. A length of the second end edge 111 is shorter than the width of the base plate 102, and the second end edge is centered relative to the axis at the longitudinal center of the base plate.

The base plate 102 also has a slot 114 which is a hole in the first overlapping portion as better shown in FIG. 2. The slot is spaced inward from the first end edge 110 toward the junction line 112. The slot is elongate and has a start thereof at a first slot end edge proximate a first one of the lateral edges of the base plate. The slot extends from the start of the slot to an end of the slot at a second slot end edge thereof proximate a second one of the lateral edges of the base plate. Opposing slot side edges, which are parallel, span in the lateral direction of the base plate 102 and join the first and second slot end edges. The slot side edges are parallel to the first end edge 114, and the slot is centered relative to the axis at the longitudinal center of the base plate. Furthermore, a length of the slot 114 is less than the width of the base plate 102, where the length of the slot is defined by a distance between a portion of each one of the first and second slot end edges closest to respective lateral edges of the base plate.

Additionally, the base plate 102 has a flange 116 which is a protruding element coupled to the second overlapping portion 106, projecting upwards therefrom as better shown in FIG. 3. The flange is configured for upwards insertion into the slot 118 such that the first one of the support sections and the second one of the support sections can be longitudinally coupled in rectilinear alignment in a working position when the first overlapping portion 104 of the second one of the support sections overlaps the second overlapping portion of the first one of the support sections. The flange has a bottom edge 118 which is a first edge of the protruding element that meets the second overlapping portion. To achieve the rectilinear alignment of the first and second ones of the support sections, the bottom edge is parallel to the junction line 112 so as to match the orientation of the slot 114 relative to the first end edge 110 of the first overlapping portion. The bottom edge of the flange is also centered relative to the axis at the longitudinal center of the base plate 102. Additionally, the bottom edge 118 of the flange 116 is arranged at a distance outward from the junction line, towards the second end edge of the second overlapping portion, so as to be equal to the spacing of the slot from the first end edge 110. Consequently, the first end edge is substantially aligned with the junction line 112 in the working position, and the lateral edges of the base plate at the first overlapping portion extend laterally outward beyond the lateral edges at the second overlapping portion in the working position.

Because the bottom edge 118 of the flange 116 and the slot have rectilinear shape, two additional structural features are necessary in order to facilitate interlocking of the flange and slot 114 so as to reduce movement between the first one of the support sections and the second one of the support sections in the working position. Firstly, a thickness at the bottom edge of the flange defined by the distance between outer surfaces of the flange at the bottom edge is proximate a width of the slot, which is the distance between the opposite slot side edges. The respective outer surfaces of the flange define first and second longitudinal surface portions thereof facing in respective opposing longitudinal directions, and the slot side edges define longitudinal edge portions of the slot at longitudinally opposing ends thereof. Approximately matching the thickness at the bottom edge of the flange and the width of the slot reduces longitudinal movement of the first one of the support sections relative to the second one of the support sections in the working position because the outer surfaces of the flange engage the respective slot side edges in the working position. Also, a flange length defined as a distance between opposite flange side edges 120 at the bottom edge 118 is approximately equal to the length of the slot 114 such that lateral movement of the first one of the support sections relative to the second one of the support sections is reduced in the working position because the flange side edges engage the respective first and second end edges of the slot in the working position. The flange side edges 120 define first and second transverse surface portions of the flange facing in respective opposing transverse directions, and the first and second end edges of the slot define respective transverse edge portions of the slot at opposing transverse ends thereof.

Alluding to the structure of the flange 116 further, the flange side edges 120 start at the bottom edge 118, meeting the bottom edge at right angles, and extend vertically upwards therefrom. The side edges terminate at a top edge 122 of the flange that is aligned with the bottom edge so as to lie in a common vertical plane. Each of the side edges are parallel to one another, so that the flange length is uniform from bottom to top. Furthermore, the distance between outer surfaces of the flange is consistent between the bottom edge and the top edge so that the thickness of the flange is uniform from bottom to top. As such, the first overlapping portion 104 of the second one of the support sections must be substantially parallel to the second overlapping portion 106 of the first one of the support sections so that the slot receives the flange therein.

For efficient use of material, a longitudinal length of the second overlapping portion 106 defined as a distance from the junction line 112 to the end edge of the second overlapping portion is equal to the spacing of the slot 114 from the first end edge 110 of the first overlapping portion 104. Thus, the bottom edge 118 of the flange 116 is aligned with the end edge of the second overlapping portion. Furthermore, the length of the end edge of the second overlapping portion is equal to the flange length. As such, the complete base structure of the support section can be manufactured from a single piece of material, and the flange 116 is created by bending an end portion at the free longitudinal end of the second overlapping portion 106 upwards.

A tab 124 is coupled to the flange 116 and is a projecting element that is rectangular in shape and orientated lengthwise in the lateral direction of the base plate 102. An uppermost edge of the tab is attached to the flange proximate the top edge thereof so that remaining three edges of the tab are free. The uppermost edge is attached to the flange so that a bottommost free end 126 is pivotable relative to the flange about the uppermost edge of the tab. Further, the bottommost free end of the tab is oriented downwards toward the second overlapping portion 106 and projects away from the flange in a neutral position thereof so as to engage the second overlapping portion in the working position of the support sections 100 when the flange is being removed from the slot 114 in the downwardly direction. Opposite side edges of the tab join the uppermost edge to the bottommost free end and are parallel to one another, meeting both the uppermost edge and bottommost free end at right angles. The tab is centered relative to the flange such that the midpoint of the uppermost edge of the tab is aligned with the midpoint of the top edge 122 of the flange along a vertical axis. The tab serves as a retaining mechanism to prevent the flange 116 from being unintentionally removed from the slot 114 in the working position. The two support sections may be decoupled from the working position by first pressing the bottommost free end 126 of the tab 124 towards the flange in a compressed position of the tab and holding the tab therein; then, the flange is removed from the slot by lifting the first overlapping portion 104 of the second one of the support sections, lowering the second overlapping portion 106 of the first one of the support sections, or a combination of the two actions. The tab 124 may be released from the compressed position as soon as the slot 114 is generally above the bottommost free end 126 of the tab.

A support arrangement 128 is arranged on the base plate 102 to support the cooling pipes and reinforcing bars. The support arrangement is attached to the first overlapping portion 104 and the middle portion 108 so as to stand upwardly therefrom. The support arrangement comprises a plurality of rink chair supports 130 arranged in a row across the base. Each one of the rink chair supports provides support for a single cooling pipe. A horizontal support member 132 spans a full length of the support arrangement and is arranged to support reinforcing bars between adjacent rink chair supports on the horizontal support member. The horizontal support member is arranged at a height above the base plate 102, yet below the portions of the rink chairs where the cooling pipes are supported therein. The rink chair supports are spaced longitudinally along the base plate so as to support the cooling pipes at proper longitudinal intervals, which is important for providing uniform cooling of the cast covering layer of the ice rink. Further, the horizontal support member has a first free end 134 at one longitudinal end thereof above the first overlapping portion that is spaced inward horizontally at a first distance from the first end edge 110 toward the junction line 112. A second free end 136 of the horizontal support member at an opposite longitudinal end thereof above the middle portion 108 and closer to the second overlapping portion than to the first overlapping portion is spaced inward horizontally at a second distance from the junction line toward the first end edge 110. The second distance is approximately equal to the first distance so as to maintain proper spacing in the longitudinal direction between the cooling pipes and reinforcing bars supported by the support arrangements 128 in the working position.

Figure 4:
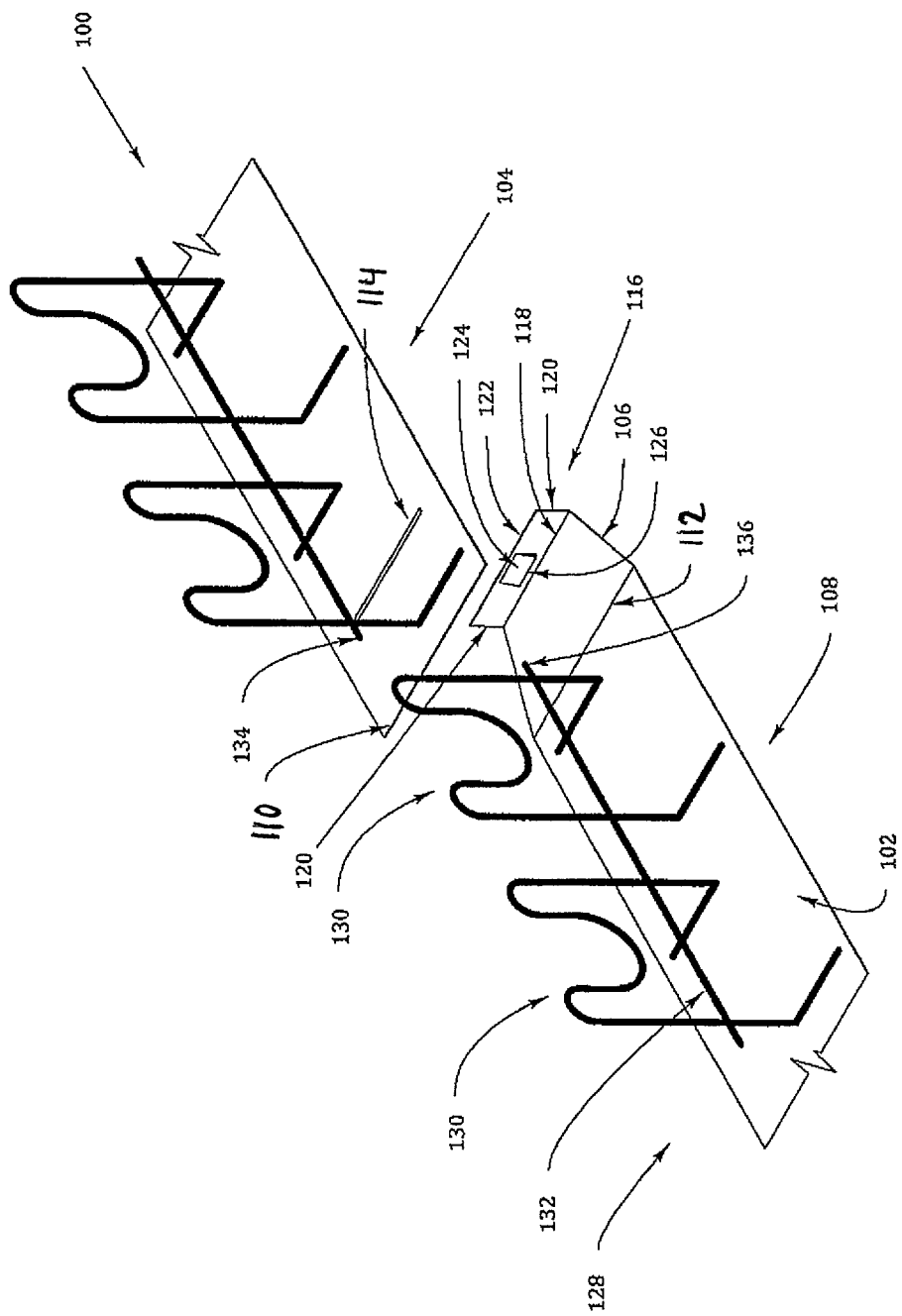
FIG. 4 is a right perspective view of two rink chair support sections from rears thereof, aligned with one another prior to coupling together in a working position.
Figure 5:
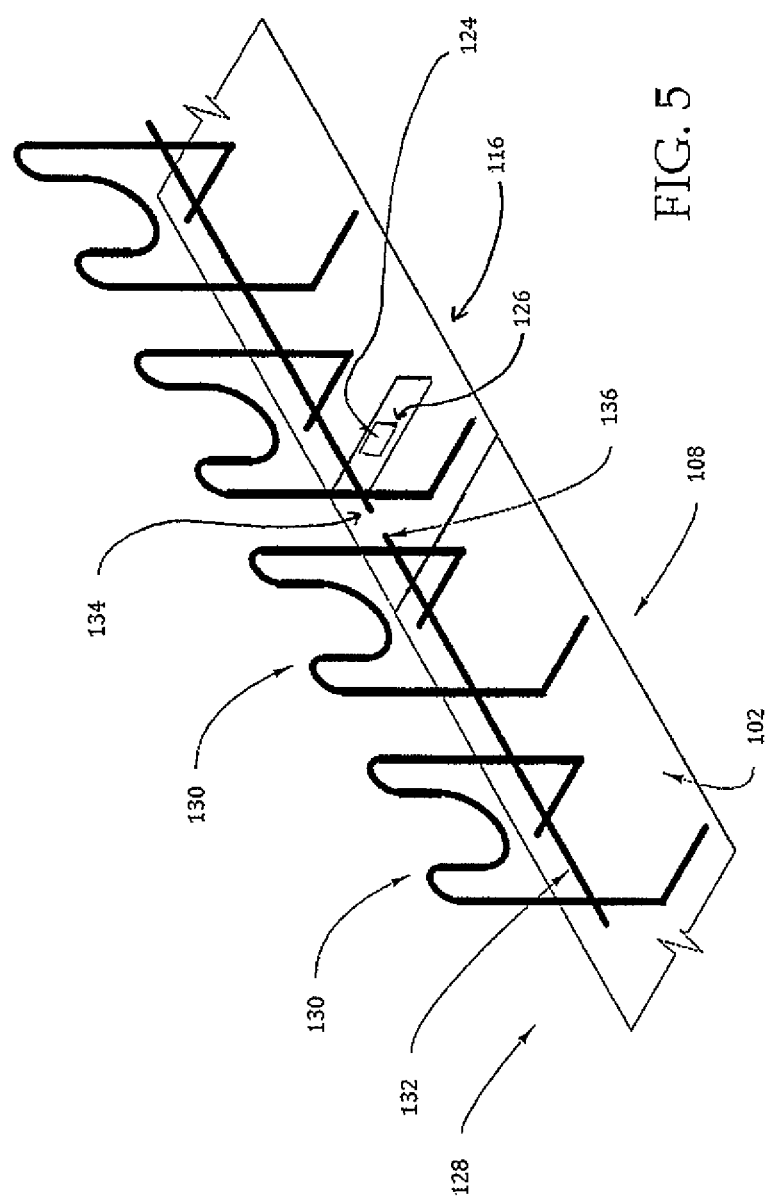
FIG. 5 is a right perspective view of the two rink chair support sections in FIG. 4 coupled together in the working position.

In use, the rink chair support sections 100 are first arranged end-to-end in a plurality of rows. Each one of the rows spans a full width or a full length of the ice rink, and the plurality of rows are spaced therebetween along a dimension of the ice rink transverse to the rows. After arranging the rows, the support sections within each one of the rows are coupled to one another. As illustrated in FIG. 4, coupling is accomplished by positioning the first overlapping portion 104 of a second support section above the second overlapping portion 106 of a first support section so that the slot 114 of the second support section is vertically aligned with the flange 116 of the first support section in a common vertical plane. Next, the second support section is lowered onto the first support section so that the corresponding overlapping portions of respective support sections overlap. Lowering the first overlapping portion of the second support section onto the second overlapping portion of the first support section in the manner described will cause the slot of the second support section to engage the tab 124 coupled to the flange of the first support section, pushing the bottommost free end 126 of the tab towards the flange and allowing the flange to be inserted into the slot. The longitudinal end-to-end coupling ensures that each one of rink chair supports 130 in each one of the rows supports a different cooling pipe. Once the support sections of each one of the rows are coupled together as in FIGS. 5-6, the second free end 136 of the support arrangement 128 of the first support section should be proximate in alignment with the first free end 134 of the horizontal support member of the second support section in height in a vertical axis, and horizontally both in a longitudinal axis and in a transverse axis. Note that to decouple support sections, the reverse process of the coupling procedure should be followed; however, the tab 124 has to be pressed and held in the compressed position until the slot 114 is above the bottommost free end 126 of the tab, so that the flange 116 can be removed from the slot.

Figure 6:
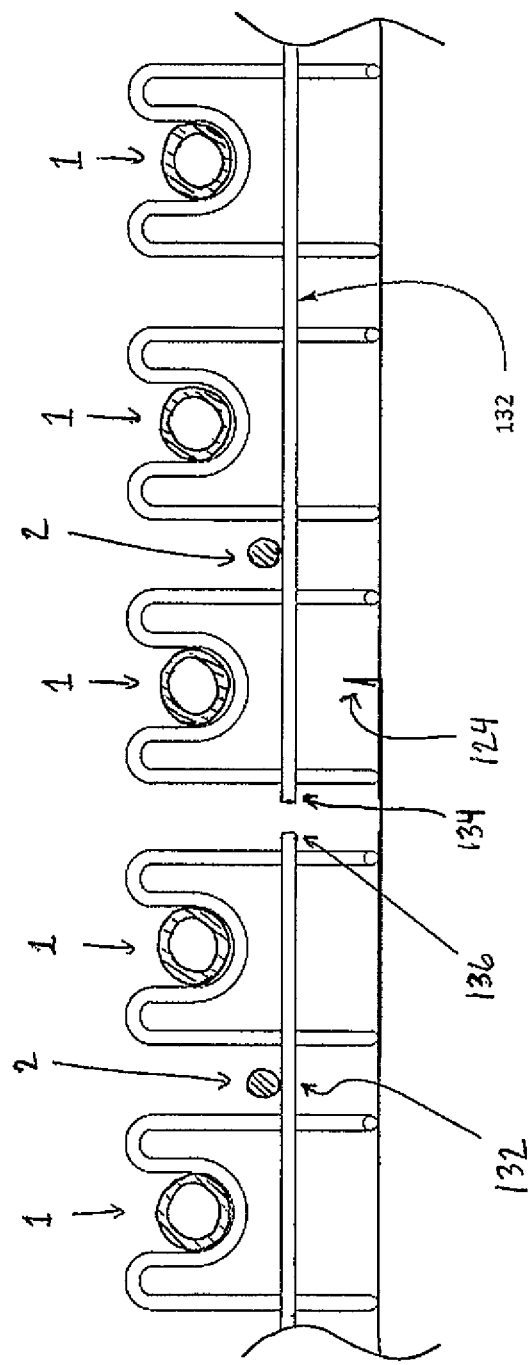
FIG. 6 is a left elevation view of the two rink chair support sections in FIG. 5 coupled in the working position and supporting cooling pipes and reinforcing bars thereon.

Once all of the support sections comprising each one of the rows are coupled together, the support sections are ready to receive the cooling pipes 1 and reinforcing bars 2 in the support arrangements 128 of the support sections, First, a first layer of reinforcing bars is set upon the rink chair support sections so as to be received in the rink chair support sections by the support arrangements thereof, extending across the rows and lying in a first common horizontal plane; the first layer of reinforcing bars are mutually perpendicular to the rows. Next, a second layer of reinforcing bars is set so as rest upon the first layer of reinforcing bars, extending across the first layer and lying in a second common horizontal plane above the first plane; the second layer of reinforcing bars are mutually transverse to the first layer of reinforcing bars at right angles thereto and mutually parallel to the rows. Finally, the cooling pipes are set upon the rink chair support sections so as to be received in the rink chair support sections by the support arrangements thereof, extending across the second layer of reinforcing bars and lying in a third common horizontal plane that is above the first plane and above the second plane; the cooling pipes are mutually transverse to the rows at right angles thereto, mutually parallel to the first layer of reinforcing bars, and mutually transverse to the second layer of reinforcing bars at right angles thereto. After all of the reinforcing bars 2 and cooling pipes 1 are set in a manner similar to an arrangement just described that is generally illustrated in FIG. 6 without the second layer of reinforcing bars, the cast concrete layer may be applied so as to embed the reinforcing bars and cooling pipes therein.

Since various modifications can be made in my invention as herein above described, and many apparently widely different embodiments of same made, it is intended that all matter contained in the accompanying specification shall be interpreted as illustrative only and not in a limiting sense.

The invention claimed is:

1. A method for supporting cooling pipes and reinforcing bars prior to installation of a cast concrete layer thereupon in an ice rink, wherein the ice rink also comprises a horizontal ground surface, the method comprising the following steps given in no particular order:
   providing a plurality of rink chair support sections, each one of the rink chair support sections having:
      a base structure forming a plate for resting on the ground surface, the base structure spanning longitudinally between first and second ends and having first and second sides spanning between the first and second ends;
      a support arrangement including at least one pipe support standing upwardly from the base structure and forming a receptacle at a position spaced above the base structure which is arranged to receive the respective cooling pipe transversely of the base structure;
      the support arrangement including a support member extending longitudinally of the base structure at a position spaced above the base structure but below the receptacle of the respective pipe support, the support member thus being arranged to support the reinforcing bars extending transversely of the base structure adjacent the respective pipe support;
      a terminal end of the support arrangement closest to the first end being spaced longitudinally inwardly from the first end leaving a portion of the base structure proximal the first end over which no support arrangement is located;
   arranging the plurality of support sections in a plurality of rows;
   setting the reinforcing bars upon the rink chair support sections so as to be received therein by the support arrangements thereof;
   setting the cooling pipes upon the rink chair support sections so as to be received therein by the support arrangements thereof;
   wherein the respective one of the rink chair support sections further includes a coupling arrangement comprising:
      a protruding element upstanding from the base structure with a top spaced below the support member;
      the protruding element being arranged at that portion of the base structure proximal the first end over which there is no support arrangement at a location spaced longitudinally in a direction towards the first end of the base structure by a prescribed distance from one of the pipe supports closest to the first end;

a hole formed in the base structure at a location closer to the second end than to the first end of the base structure;

the hole being spaced from the second end by a distance substantially equal to said prescribed distance;

the hole of a first one of the support sections being arranged for receiving therethrough the protruding element of a second one of the support sections such that the base structures of the first one of the support sections and the second one of the support sections are held overlapped, with the base structure of the first one of the support sections over top the base structure of the second one of the support sections, so that the support sections are coupled end-to-end so as to be longitudinally inline in rectilinear alignment;

the hole and protruding element being elongated in a common direction so as to be shaped to resist movement of said support sections out of the rectilinear alignment;

and, in each one of the rows, overlapping the base structures of each rink chair support section and the next in a manner passing the protruding element of one of the rink chair support sections through the hole of the adjacent one of the rink chair support sections so as to couple each rink chair support section and the next forming the respective row in fixed relation to one another.

2. The method according to claim 1, wherein each one of the rink chair support sections further comprises a retaining mechanism on the protruding element that resists removal of the protruding element of the second one of the support sections through the hole of the first one of the support sections when the support sections are coupled end-to-end.

3. The method according to claim 2, wherein the retaining mechanism is a tab coupled at one end thereof to the protruding element and projecting away therefrom to a free end of the tab held spaced from the protruding element in a neutral position, the tab being pivotally movable out of the neutral position about said one end coupled to the protruding element.

4. The method according to claim 1, wherein the base structure is a horizontal plate.

5. The method according to claim 1, wherein the protruding element is a flange arranged at the first end spaced by the prescribed distance from the one of the pipe supports closest thereto.

6. The method according to claim 1 wherein the hole and protruding element are elongated in the common direction from the first side to the second side of the base structure.

7. The method according to claim 1 wherein the hole and protruding element each are rectilinearly shaped in plan view.

8. The method according to claim 1 wherein the protruding element forms an upstanding plate.

9. The method according to claim 3 wherein the tab is inclined downwardly such that the free end of the tab is opposite of and lower than said one end where the tab is coupled to the protruding element.

10. A method for supporting cooling pipes and reinforcing bars prior to installation of a cast concrete layer thereupon in an ice rink, wherein the ice rink also comprises a horizontal ground surface, the method comprising the following steps given in no particular order:

providing a plurality of rink chair support sections, each one of the rink chair support sections having:

a base structure forming a plate for resting on the ground surface, the base structure spanning longitudinally between first and second ends and having first and second sides spanning between the first and second ends;

a support arrangement including at least one pipe support standing upwardly from the base structure and forming a receptacle at a position spaced above the base structure which is arranged to receive the respective cooling pipe transversely of the base structure;

the support arrangement including a support member extending longitudinally of the base structure at a position spaced above the base structure but below the receptacle of the respective pipe support, the support member thus being arranged to support the reinforcing bars extending transversely of the base structure adjacent the respective pipe support;

a terminal end of the support arrangement closest to the first end being spaced longitudinally inwardly from the first end leaving a portion of the base structure proximal the first end over which no support arrangement is located;

arranging the plurality of support sections in a plurality of rows;

setting the reinforcing bars upon the rink chair support sections so as to be received therein by the support arrangements thereof;

setting the cooling pipes upon the rink chair support sections so as to be received therein by the support arrangements thereof;

wherein the respective one of the rink chair support sections further includes a coupling arrangement comprising:

a protruding element upstanding from the base structure with a top spaced below the support member;

the protruding element being arranged at that portion of the base structure proximal the first end over which there is no support arrangement at a location spaced longitudinally in a direction towards the first end of the base structure by a prescribed distance from one of the pipe supports closest to the first end;

a hole formed in the base structure at a location closer to the second end than to the first end of the base structure;

the hole being spaced from the second end by a distance substantially equal to said prescribed distance;

the hole being arranged beneath one of the pipe supports closest to the second end;

the hole of a first one of the support sections being arranged for receiving therethrough the protruding element of a second one of the support sections such that the base structures of the first one of the support sections and the second one of the support sections are held overlapped, with the base structure of the first one of the support sections over top the base structure of the second one of the support sections, so that the support sections are coupled end-to-end so as to be longitudinally inline in rectilinear alignment;

and, in each one of the rows, overlapping the base structures of each rink chair support section and the next in a manner passing the protruding element of one of the rink chair support sections through the hole of the adjacent one of the rink chair support sections so as to couple each rink chair support section and the next forming the respective row in fixed relation to one another.

11. The method according to claim 10 wherein the protruding element is a flange arranged at the first end spaced by the prescribed distance from the one of the pipe supports closest thereto.

12. The method according to claim 10 wherein the hole and protruding element are elongated in a common direction so as to resist movement out of the rectilinear alignment.

13. The method according to claim 10 wherein the protruding element forms an upstanding plate.

14. A method for supporting cooling pipes and reinforcing bars prior to installation of a cast concrete layer thereupon in an ice rink, wherein the ice rink also comprises a horizontal ground surface, the method comprising the following steps given in no particular order:
  providing a plurality of rink chair support sections, each one of the rink chair support sections having:
    a base structure forming a plate for resting on the ground surface, the base structure spanning longitudinally between first and second ends and having first and second sides spanning between the first and second ends;
    a support arrangement including at least one pipe support standing upwardly from the base structure and forming a receptacle at a position spaced above the base structure which is arranged to receive the respective cooling pipe transversely of the base structure;
    the support arrangement including a support member extending longitudinally of the base structure at a position spaced above the base structure but below the receptacle of the respective pipe support, the support member thus being arranged to support the reinforcing bars extending transversely of the base structure adjacent the respective pipe support;
    a terminal end of the support arrangement closest to the first end being spaced longitudinally inwardly from the first end leaving a portion of the base structure proximal the first end over which no support arrangement is located;
  arranging the plurality of support sections in a plurality of rows;
  setting the reinforcing bars upon the rink chair support sections so as to be received therein by the support arrangements thereof;
  setting the cooling pipes upon the rink chair support sections so as to be received therein by the support arrangements thereof;
  wherein the respective one of the rink chair support sections further includes a coupling arrangement comprising:
    a protruding element upstanding from the base structure with a top spaced below the support member;
    the protruding element being arranged at that portion of the base structure proximal the first end over which there is no support arrangement at a location spaced longitudinally in a direction towards the first end of the base structure by a prescribed distance from one of the pipe supports closest to the first end;
    a hole formed in the base structure at a location closer to the second end than to the first end of the base structure;
    the hole being spaced from the second end by a distance substantially equal to said prescribed distance;
    the hole of a first one of the support sections being arranged for receiving therethrough the protruding element of a second one of the support sections such that the base structures of the first one of the support sections and the second one of the support sections are held overlapped, with the base structure of the first one of the support sections over top the base structure of the second one of the support sections, so that the support sections are coupled end-to-end so as to be longitudinally inline in rectilinear alignment;
    a tab on the protruding element that resists removal of the protruding element of the second one of the support sections through the hole of the first one of the support sections when the support sections are coupled end-to-end;
    the tab being coupled at one end thereof to the protruding element and projecting away therefrom to a free end of the tab held spaced from the protruding element in a neutral position, the tab being pivotally movable out of the neutral position about said one end coupled to the protruding element;
  and, in each one of the rows, overlapping the base structures of each rink chair support section and the next in a manner passing the protruding element of one of the rink chair support sections through the hole of the adjacent one of the rink chair support sections so as to couple each rink chair support section and the next forming the respective row in fixed relation to one another.

15. The method according to claim 14 wherein the tab is inclined downwardly such that the free end of the tab is opposite of and lower than said one end where the tab is coupled to the protruding element.

16. The method according to claim 14 wherein the protruding element is a flange arranged at the first end spaced by the prescribed distance from the one of the pipe supports closest thereto.

17. The method according to claim 14 wherein the protruding element forms an upstanding plate.

18. The method according to claim 14 wherein the base structure is a horizontal plate.

19. The method according to claim 14 wherein the hole and protruding element each are rectilinearly shaped in plan view.

20. The method according to claim 14 wherein the hole and protruding element are elongated in a common direction so as to resist movement out of the rectilinear alignment.

* * * * *